United States Patent [19]

Abo et al.

[11] 4,296,600
[45] Oct. 27, 1981

[54] FUEL CONTROL DEVICE FOR A GAS TURBINE

[75] Inventors: Toshimi Abo; Hidetoshi Kanegae, both of Yokohama, Japan

[73] Assignee: Nissan Motor Company, Limited, Kanagawa, Japan

[21] Appl. No.: 116,866

[22] Filed: Jan. 30, 1980

[30] Foreign Application Priority Data

Feb. 6, 1979 [JP] Japan .................................. 54-12615

[51] Int. Cl.³ .............................................. F02C 9/32
[52] U.S. Cl. ............................ 60/39.28 R; 290/40 R; 364/431
[58] Field of Search .................. 60/39.28 R, 39.28 P; 290/40 A, 40 B, 40 C, 40 D; 364/431; 123/492, 493

[56] References Cited

U.S. PATENT DOCUMENTS

| | | | |
|---|---|---|---|
| 4,100,877 | 7/1978 | Scott et al. | 60/39.28 R |
| 4,144,847 | 3/1979 | Hosaka | 123/492 |
| 4,144,864 | 3/1979 | Kato | 123/493 |
| 4,185,203 | 1/1980 | Takeuchi | 290/40 C |

Primary Examiner—Robert E. Garrett
Attorney, Agent, or Firm—Lowe, King, Price & Becker

[57] ABSTRACT

When the rate of increase of the load on a gas turbine with time is higher than a reference value, the amount of fuel supplied to the turbine is temporarily increased whereas, when the rate of decrease of the load with time is higher than a certain predetermined value, the amount of fuel supplied to the turbine is temporarily decreased. However, for a certain predetermined time interval after this decreasing of the fuel amount has ended, an increase in the amount of fuel supplied to the turbine is suppressed to a minimum even if the load on the gas turbine increases.

6 Claims, 6 Drawing Figures

FUEL CONTROL DEVICE FOR A GAS TURBINE

BACKGROUND OF THE INVENTION

The present invention relates to a fuel control device for gas turbines and particularly to a fuel control device for a gas turbine for use with an electric generator which device controls the amount of intake fuel supplied to the gas turbine so as to maintain constant the revolution speed thereof.

In a double-axle gas turbine, including a compressor turbine and an output turbine, which drives an electric generator, fluctuations of the revolution speed of the output turbine appear directly as fluctuations of the electric current generated. Thus big fluctuations of the output revolution speed are not permissible.

In the near steady-state operation of the gas turbine, it is possible to control a fuel control servo valve on the basis of conventional feedback control (proportional and integral control) so as to maintain constant the revolution speed of the gas turbine. However, if a sharp fluctuation of the load takes place, a large lag in response in the fuel supply will occur, whereby the revolution speed of the output turbine will fluctuate beyond its permissible range. Thus, in the prior art, the flow rate of fuel to the turbine has been further controlled by an override fuel control system according to the load on the output turbine in such a way that, if the load sharply changes, the amount of fuel supplied will be changed by a corresponding amount. For example, when the load sharply decreases, a minimum flow rate of fuel substantially necessary to maintain the combustion is maintained and the remaining fuel supply is stopped. On the other hand, when the load sharply increases, an additional amount of fuel is supplied by a system different from the fuel control valve.

The specific circuit for this prior art control will be described, referring to FIGS. 1 and 2 of the accompanying drawings. A load sensor 10 senses the load on the output turbine and outputs a signal S10 proportional in magnitude to the load. This signal is differentiated with respect to time in a differentiating circuit 12 to obtain a signal S12 corresponding to the rate of change of the load. The signal S12 is compared with reference values S14R and S16R in a fuel increase comparator 14 and in a fuel decrease comparator 16, respectively. The fuel increase comparator 14 outputs a signal S14 of high level "1" while S12 is larger than S14R so as to operate a drive circuit 18 for a sharp fuel increase valve (not shown), thereby temporarily increasing the flow rate of fuel according to a sharp increase in the load.

Similarly the decrease comparator 16 outputs a signal S16 of high level "1" while S12 is smaller than S16R so as to operate a drive circuit 20 for a sharp fuel decrease valve such as a relief valve (not shown), thereby temporarily decreasing the flow rate of fuel according to a sharp decrease in the load. This system is of course fitted in addition to the normal feed back fuel control system.

However, in spite of such a control system for fuel supply, repetitions of sharp load fluctuations in a short time will cause the following problem. For example, when the load sharply decreases and immediately thereafter sharply increases, the fuel supply to, and therefore the revolution speed of, the compressor turbine decreases and immediately thereafter the fuel supply increases. This surge in the fuel supply to the turbine largely shortens the life time of the turbine. Further, as a matter of course, immediately after the sharp decrease in the load and the fuel supply, the revolution speed of the output turbine is likely to increase rather above the setting point, due to the sharp decrease in the load. Accordingly the subsequent sharp increase in the load does not require so sharp a corresponding increase in the fuel supply as it would require, if not preceded by a sharp decrease in the load.

SUMMARY OF THE INVENTION

It is therefore an object of the present invention to provide a fuel control device for a gas turbine, which avoids a surge in the fuel supply in spite of great fluctuations in the load which may occur in a certain short time immediately after a sharp decrease in the fuel supply to the turbine.

Another object of the present invention is to provide a fuel control device for a gas turbine, which suppresses fluctuations in the output revolution speed to a minimum, in spite of great fluctuations in the load in a certain short time immediately after a sharp decrease in the fuel supply to the turbine.

Other objects, features and advantages of the present invention will be apparent from the following description when taken in conjunction with the accompanying drawings.

BRIEF DESCRIPTION OF THE DRAWINGS

The accompanying drawings, however, should not be taken as limiting the present invention in any way, but are given for purposes of illustration only. In the drawings, like parts are denoted by like reference numerals in the several figures, and.

DETAILED DESCRIPTION OF THE PREFERRED EMBODIMENTS

Figure 3:
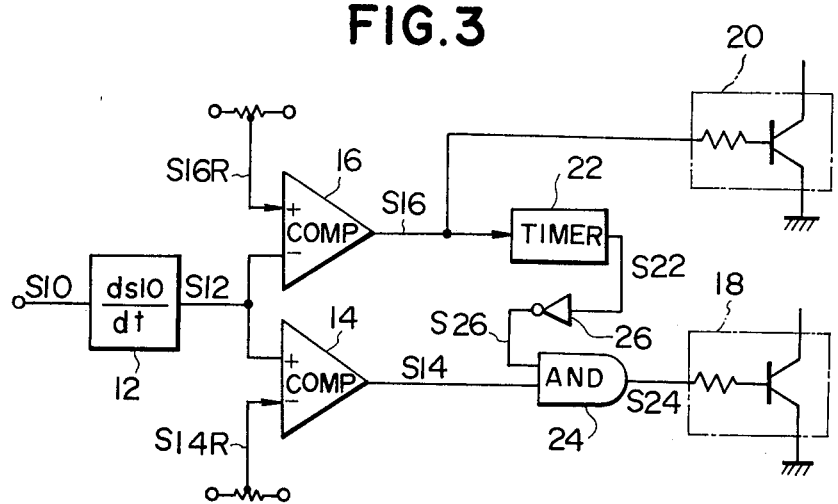
FIG. 3 is a schematic view of a first embodiment of a fuel control device for a gas turbine according to the present invention.
Figure 4:
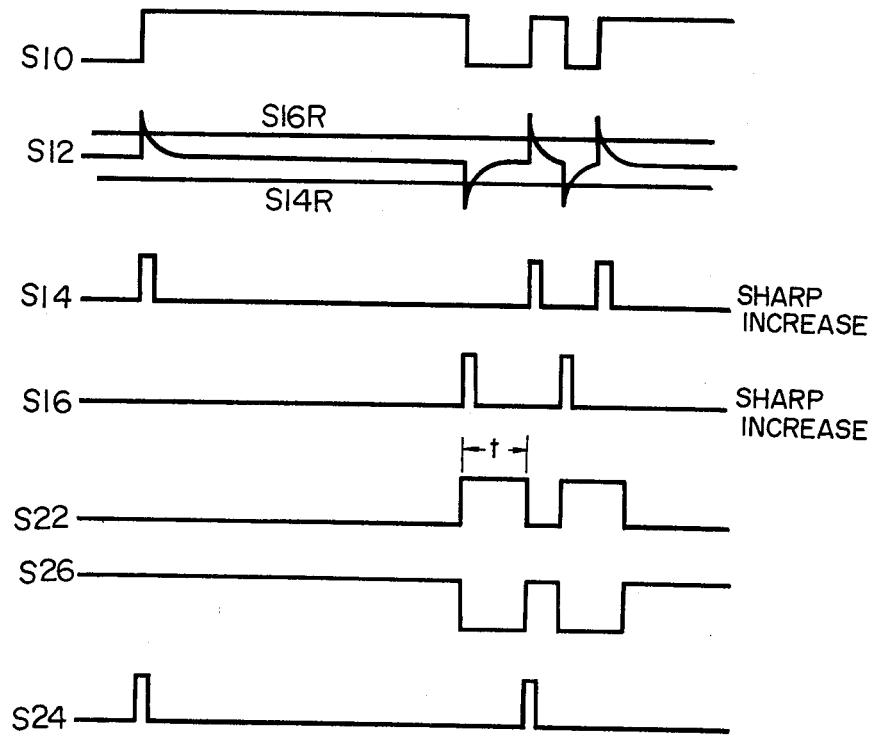
FIG. 4 is a time chart of pulses in the FIG. 4 device.

Referring to FIGS. 3 and 4 of the drawings, a first preferred embodiment of a fuel control device according to the present invention is shown. The basic concept of the present invention is that a sharp increase in the fuel supply to the gas turbine, not shown, is not effected immediately (i.e. within a certain short time period) after a sharp decrease in the fuel supply. Thus, the FIG. 3 circuit, includes, in additional to the FIG. 1 circuit, a timer circuit (for example a monostable multivibrator) 22, actuated simultaneously with the outputting of a sharp decrease signal S16 from the sharp decrease comparator 16, and an inhibiting circuit comprising an AND gate 24 which inhibits the passing of the fuel increase signal S14 from the sharp increase comparator 14 to a drive circuit 18, only during the set time interval t of the timer 22.

Thus, the timer circuit 22 outputs a signal S22 of high level "1" continuing for a predetermined time interval which starts simultaneously with the rise edge of the sharp decrease signal S16. This high level signal S22 is inverted in polarity by an inverter 26, and then is inputted as signal S26 into the AND gate 24. Thus though the comparator 14 may output the increase signal S14 for this time interval, the output S24 of the AND gate 24 is held at the low level "0" for as long as the inverter 26 outputs "0" to the AND gate 24, whereby the drive circuit 18 will not be actuated.

That is, as will be seen from FIG. 4, if the comparator 16 outputs the decrease signal S16, due to a sharp decrease in the load so that the supply fuel sharply decreases, and, immediately after the sharp decrease in the load, the load then sharply increases, within the time interval set by timer circuit 22, then the increase signal S14 will not be supplied from the comparator 14 to the drive circuit 18, because the AND gate 24 is closed. That is, the third spike, in S14, in the example of the pulses of FIG. 4, is not fed through the AND gate 24 to appear as S24. Thus the fuel supplied is not increased. As a result, as stated above, the surge of fuel will not take place and the revolution speed of the output turbine is controlled to be in the permissible range.

Figure 1:
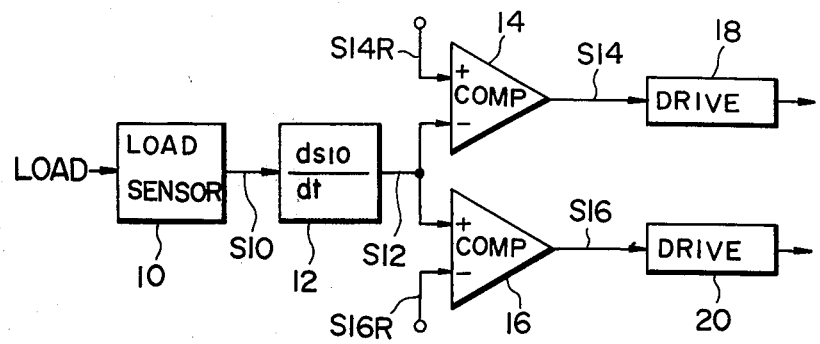
FIG. 1 is a block diagram of a prior art fuel control device for a gas turbine.
Figure 2:
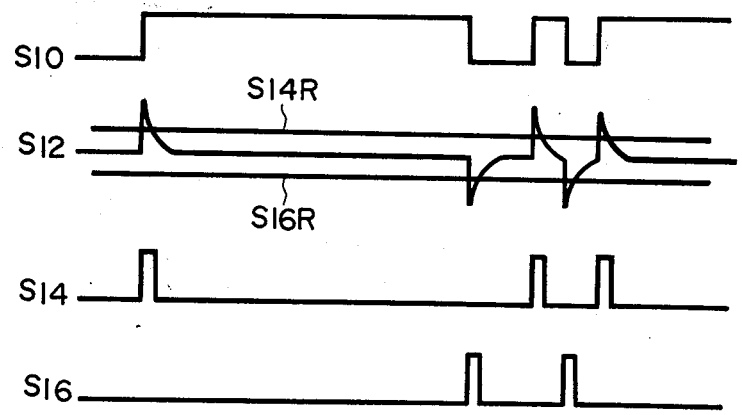
FIG. 2 is a time chart of pulses in the FIG. 1 device.

The FIG. 3 circuit operates in substantially the same manner as the FIG. 1 circuit when a sharp load increase occurs after the time interval determined by the timer.

Figure 5:
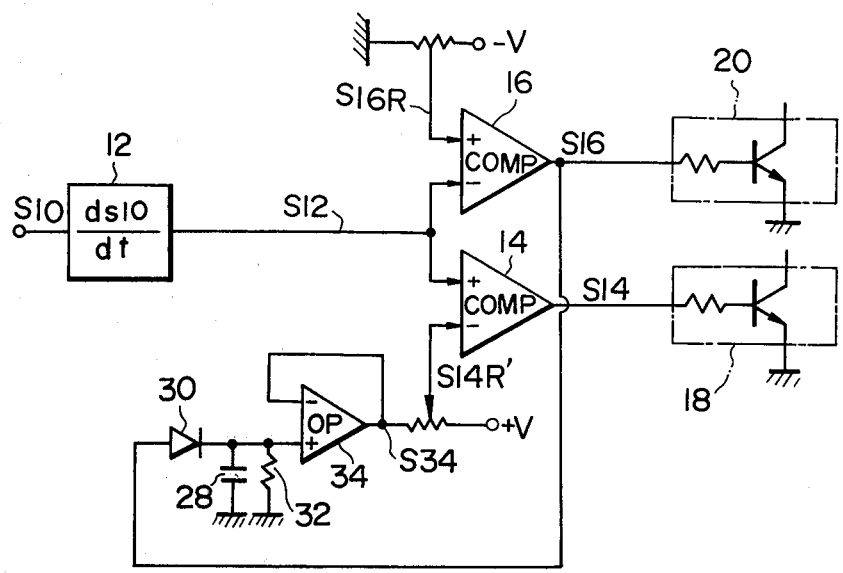
FIG. 5 is a schematic view of a second embodiment of the present invention.

Referring to FIG. 5, there is shown a second embodiment of the fuel control device according to the present invention, wherein a sharp increase in the fuel supplied is suppressed, within a certain time period after an again immediately preceeding sharp decrease in the load.

The decrease signal S16 from the decrease comparator 16 charges a capacitor 28 through a diode 30. The electric charge stored in the capacitor 28 is discharged through a resistor 32. Thus the output of a buffer amplifier which may be a voltage follower 34 decreases exponentially with time, as shown by S34 in FIG. 6, depending on the discharge time constant of an attenuation circuit defined by the capacitor 28 and the resistor 32.

Figure 6:
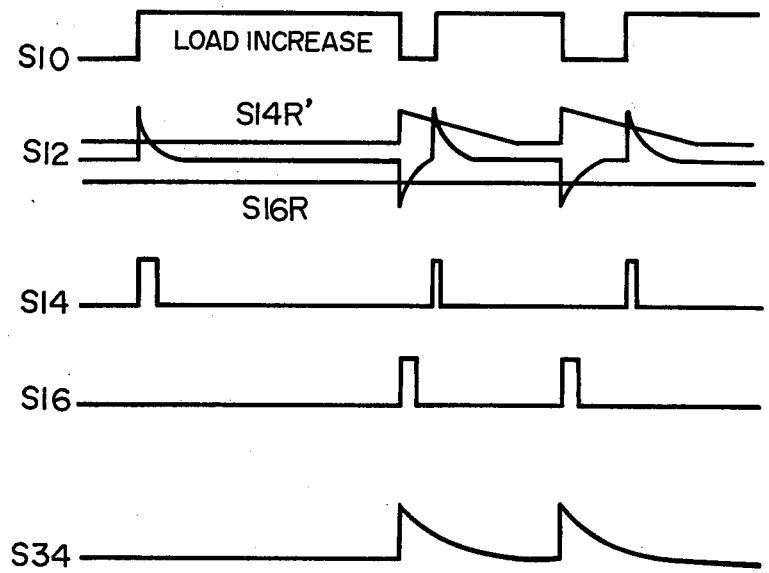
FIG. 6 is a time chart of pulses in the FIG. 5 embodiment.

Superposing of the output of the buffer amplifier 34 on the comparison reference voltage of the increase comparator 14 increases the comparison reference value after sharp decrease in the load, as shown by S14R' in FIG. 6. If the load sharply increases during this increase in the comparison reference voltage, the time interval of the high level output S14 from the comparator 14, i.e., the width of this pulse will shorten, as shown in FIG. 6. Thus the time interval in which the fuel supply is increased due to sharp load increase is shorter, within a short period after a sharp decrease in the load, than otherwise, and thus the amount of fuel supplied to the turbine decreases. However, a certain appropriate amount of fuel is still supplied to the turbine, to such an extent that neither fuel surge nor fluctuations of the revolution speed result, corresponding to the increase in the load.

Thus, the fuel control device for a gas turbine according to the present invention effects control in which the fluctuations in the output revolution speed are small and fuel surging is unlikely to take place, thereby improving the reliability and durability of the gas turbine engine.

When the load sharply increases and immediately thereafter decreases, the fuel supply sharply increases according to the sharp increase in the load. However, the revolution speed of the output turbine is likely to decrease somewhat below the setting point, due to the sharp increase in the load. Thus, it will be preferable to effect only a conventional feedback control without decreasing the fuel supply sharply, as would be done by the above prior art override fuel control system, because of the initial sharp increase in the load, from a standpoint of decreasing fluctuations of the revolution speed of the output turbine.

While the present invention has been shown and described with reference to some preferred embodiments thereof, and with reference to the drawings, it should be understood that various changes and modifications may be made to the form and the detail thereof, by one skilled in the art, without departing from the scope of the present invention. Therefore, it should be understood by all those whom it may concern that the shown embodiments, and the drawings, have been given for the purposes of illustration only, and are not intended to limit the scope of the present invention, or of the protection sought to be granted by Letters Patent, which are solely to be defined by the accompanying claims.

What is claimed is:

1. A fuel control device for a gas turbine, comprising:
   (a) sensing means for sensing the load on the turbine to output a first signal representative of the rate of change thereof;
   (b) increase means responsive to the first signal for temporarily increasing the amount of fuel supplied to the turbine when the rate of increase of the load with time is higher than a reference value;
   (c) decrease means responsive to the first signal for temporarily decreasing the amount of fuel supplied to the turbine when the rate of decrease of the load with time is higher than a certain predetermined value; and
   (d) reducing means for reducing the amount of increase of fuel supplied by the increase means during a certain predetermined time interval after the end of functioning of the decrease means.

2. A device according to claim 1, wherein the reducing means includes a timer circuit responsive to the start of the functioning of the decrease means for interrupting completely the functioning of the increase means for the predetermined time interval.

3. A device according to claim 1, wherein the increase means includes a comparator for comparing the first signal with the reference value to produce a second signal which increases the supply of fuel to the turbine when the former is higher than the latter, wherein the decrease means includes a comparator for comparing the first signal with the predetermined value to produce a third signal which decreases the supply of fuel to the turbine when the former is higher than the latter, and wherein the reducing means includes a timer responsive to the third signal for producing a fourth signal continuing for the predetermined time interval and inhibiting means responsive to the fourth signal for preventing the passing of the second signal through the increase means.

4. A device according to claim 3, wherein the inhibiting means includes an AND gate connected to an output of the increase means.

5. A device according to claim 1, wherein the increase means includes a comparator for comparing the first signal with the reference value to produce a second signal which increases the supply of fuel to the turbine when the former is higher than the latter, wherein the decrease means includes a comparator for comparing the first signal with the predetermined value to produce a third signal which decreases the supply of fuel to the turbine when the former is higher than the latter, and wherein the reducing means includes an attenuation circuit responsive to the third signal for producing a fourth signal exponentially decreasing with time which is superimposed on the predetermined value.

6. A device according to claim 5, wherein the reducing means includes a reverse current interrupting diode between the output of the decrease means and the attenuation circuit, and a buffer circuit between the output of the attenuation circuit and means providing the predetermined value for electrically isolating the former from the latter.

* * * * *